United States Patent
Joyner et al.

(10) Patent No.: US 9,654,303 B2
(45) Date of Patent: May 16, 2017

(54) METHOD AND APPARATUS FOR EMULATING NETWORK DEVICES

(75) Inventors: David Joyner, Raleigh, NC (US); Kris Rousey, Raleigh, NC (US)

(73) Assignee: Spirent Communications, Inc., San Jose, CA (US)

( * ) Notice: Subject to any disclaimer, the term of this patent is extended or adjusted under 35 U.S.C. 154(b) by 1190 days.

(21) Appl. No.: 12/464,639

(22) Filed: May 12, 2009

(65) Prior Publication Data

US 2010/0061378 A1 Mar. 11, 2010

Related U.S. Application Data

(60) Provisional application No. 61/096,206, filed on Sep. 11, 2008.

(51) Int. Cl.
*H04L 12/46* (2006.01)
*H04L 12/24* (2006.01)

(52) U.S. Cl.
CPC ........ *H04L 12/4633* (2013.01); *H04L 41/145* (2013.01); *H04L 41/5022* (2013.01)

(58) Field of Classification Search
USPC .............. 370/351, 392, 395.3, 395.5, 395.53
See application file for complete search history.

(56) References Cited

U.S. PATENT DOCUMENTS

| | | | | |
|---|---|---|---|---|
| 6,771,645 | B1 * | 8/2004 | Sasagawa et al. | 370/392 |
| 7,447,213 | B2 * | 11/2008 | Busi et al. | 370/395.5 |
| 7,555,421 | B1 * | 6/2009 | Beckett et al. | 703/23 |
| 7,702,764 | B1 * | 4/2010 | Tannous | 709/223 |
| 7,848,333 | B2 * | 12/2010 | Zhu et al. | 370/397 |
| 2003/0206521 | A1 * | 11/2003 | Qiao | 370/230 |
| 2004/0170431 | A1 * | 9/2004 | Maciocco et al. | 398/48 |
| 2005/0147104 | A1 * | 7/2005 | Ould-Brahim | 370/395.5 |
| 2006/0018255 | A1 * | 1/2006 | Tankhiwale | 370/229 |
| 2007/0204130 | A1 * | 8/2007 | Hass et al. | 711/207 |
| 2008/0304476 | A1 * | 12/2008 | Pirbhai et al. | 370/356 |
| 2009/0168780 | A1 * | 7/2009 | Unbehagen et al. | 370/392 |
| 2009/0252058 | A1 * | 10/2009 | Chen et al. | 370/254 |
| 2014/0036923 | A1 * | 2/2014 | Takase et al. | 370/392 |

OTHER PUBLICATIONS

White Paper titled "Multi-Protocol Label Switching (MPLS) Conformance and Performance Testing," IXIA Leader in IP Performance Testing 1998-2004, pp. 1-20.
Spirent Communications, Spirent TestCenter MPLS Technologies, Jul. 2008 consisting of 4 pages.
"qTLB: Looking Inside the Look-Aside Buffer," HiPC '07 Proceedings of the 14th International Conference on High Performance Computing, pp. 107-118, Springer-Verlag, 2007.

* cited by examiner

*Primary Examiner* — Hassan Phillips
*Assistant Examiner* — Saba Tsegaye
(74) *Attorney, Agent, or Firm* — Haynes Beffel & Wolfeld LLP; Ernest J. Beffel, Jr.

(57) ABSTRACT

Methods, apparatuses, data structures, and computer readable media are disclosed that perform emulated processing of packets communicated via a physical port between emulated network devices and real network devices. The emulated processing performs forward equivalence class classification on the packets. The forward equivalence class classification varies with the contents of the packets, and subsequent to the forward equivalence class classification the emulated processing varies with particular successful classifications resulting from the forward equivalence class classification.

25 Claims, 10 Drawing Sheets

Emulated Enterprise Network

Emulated Service Provider Network

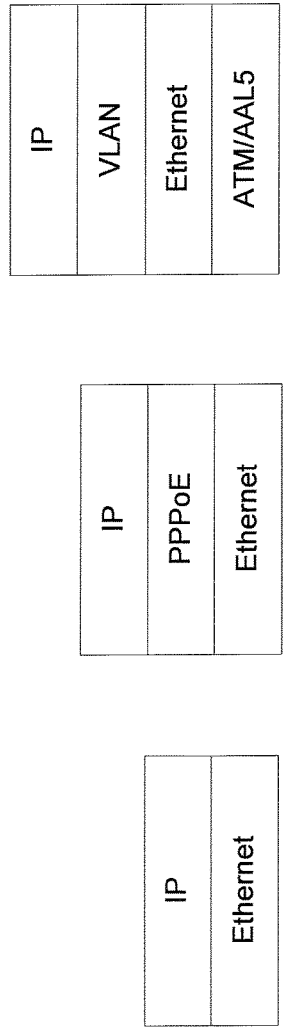
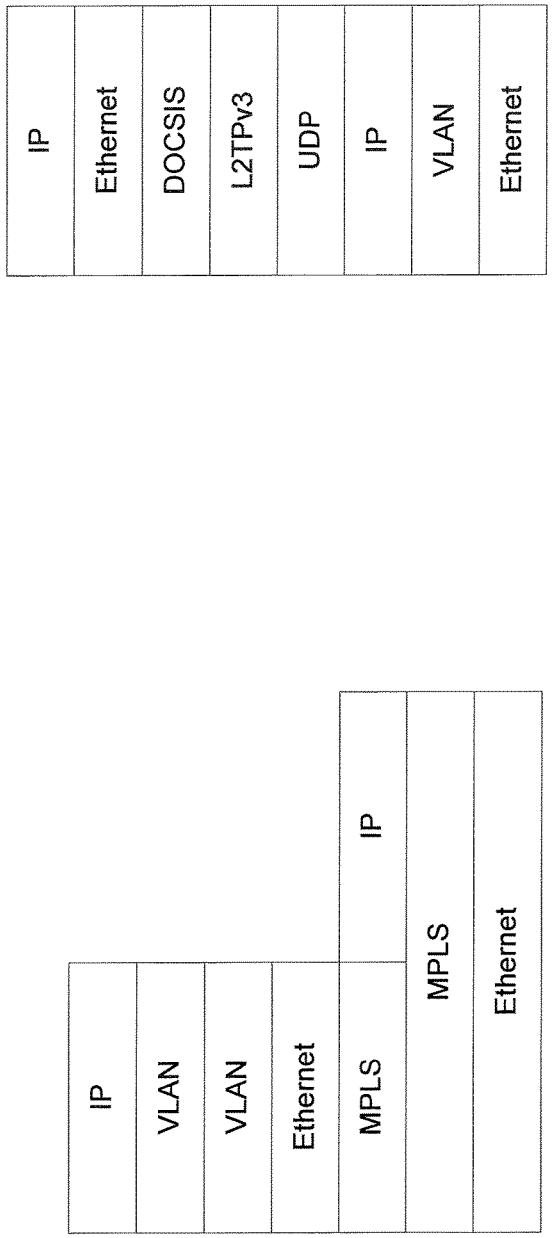

METHOD AND APPARATUS FOR EMULATING NETWORK DEVICES

REFERENCE TO RELATED APPLICATIONS

The application claims the benefit of U.S. Provisional Patent Application No. 61/096,206 filed 11 Sep. 2008 titled "METHOD AND DEVICE FOR EMULATING NETWORK DEVICES". The application(s) are incorporated by reference.

The application is related to U.S. Patent Application filed 30 May 2008 titled "METHOD AND DEVICE USING TEST DATA STREAMS BOUND TO EMULATED DEVICES", Ser. No. 12/130,944, U.S. Patent Application filed 30 May 2008 titled "REAL TIME TEST RESULT PROMULGATION FROM NETWORK COMPONENT TEST DEVICE"Ser. No. 12/130,963, and U.S. Patent Application filed 30 May 2008 titled "METHOD AND APPARATUS FOR EMULATING NETWORK DEVICES". Ser. No. 12/130,584. The related applications are incorporated by reference.

BACKGROUND

The technology relates to scalable testing of complex networks and/or complex network devices. Network test equipment to perform such useful scalable testing should emulate a large number and variety of network devices without artificial limits on the overall topology, configuration, and types of traffic.

Traffic types vary by supported network layer, link layer, and physical layer protocols, such as Internet Protocol, Generic Routing Encapsulation, Ethernet, Virtual Local Area Network 802.1q, Multiprotocol Label Switching, Point to Point Protocol over Ethernet, Point to Point Protocol, and Layer 2 Tunneling Protocol, WiMAX, Provider Backbone Bridge 802.1ah, and Asynchronous Transfer Mode. Existing network test equipment places artificial limits on the types of emulated traffic, in particular variable combinations of network layer, link layer, and physical layer protocols.

One prior approach to handling MPLS packets does not perform transmit forward equivalence class classification, but rather is a shortcut which falls well short of transmit forward equivalence class classification. This shortcut combines a forward equivalence class that is static, with dynamic binding of only the MPLS label. This shortcut does not perform forward equivalence class classification on packets, for multiple reasons. Because the shortcut determines the static forward equivalence class information before the packets even exist, the shortcut is not performing forward equivalence class classification; transmit forward equivalence class classification requires that the packets exist prior to performing forward equivalence class classification, and that the packet contents be analyzed to determine an IP address of a next hop router and an IP address of a resolving router. Instead, this short cut requires that a human user manually specify FEC binding information, in particular the IP address of a next hop router, and the IP address of a resolving router. This requirement of manual entry by a human user is driven by the following consideration. When multiple transmit FEC classifications are required to transmit a packet, the result of a subsequent FEC classification depends on the result of a prior FEC classification, and thus may be performed correctly only with a correct method. Accordingly, because this shortcut depends on FEC-to-label bindings at a particular time, which may be changing, manual entry by a human user is required. Dynamically assigning a label value to packets still does not perform forward equivalence class classification on packets. The fact that different labels are assigned does not change the static nature of the FEC to which it has been mapped.

Another prior approach to handling MPLS packets does not perform receive forward equivalence class classification, but rather is a shortcut which falls well short of receive forward equivalence class classification. This prior approach simply throws away the MPLS label, without accessing the forward equivalence class binding, and without determining the forward equivalence class and next layer protocol from the binding. Instead, this prior approach guesses the next layer protocol without use of the forward equivalence class binding. The prior approach assumes a valid FEC binding which may not even exist.

SUMMARY

Methods, apparatuses, data structures, and computer readable media are disclosed that perform emulated processing of packets communicated via a physical port between a group of emulated network devices and group of real network devices. The emulated processing performs forward equivalence class classification on the packets. The forward equivalence class classification varies with the contents of the packets. Subsequent to the forward equivalence class classification, the emulated processing varies with particular successful classifications resulting from the forward equivalence class classification.

Examples of subsequent varying emulated processing are as follows. If there are multiple MPLS labels, then the outcome of one FEC classification affects the next FEC classification. For receive, a valid FEC binding must be known, and if not known, processing halts. Similarly, the next layer protocol type, and VPN disambiguation are other examples of subsequent varying emulated processing.

The successful classifications process the contents of the packets for forward equivalence class classification, instead of discarding the contents of the packets.

The packets traverse the plurality of emulated network devices, by traversing one or more encapsulated protocol stacks. The layers of the protocol stacks represent emulated network devices.

Forward equivalence class classification refers to both transmit forward equivalence class classification and receive forward equivalence class classification. Transmit forward equivalence class classification requires the use of packet contents resulting in assignment of a forward equivalence class binding, which includes at least determination of: an IP address of a next hop router, and an IP address of a resolving router. Receive forward equivalence class classification requires the use of the MPLS label value to access the forward equivalence class binding and determining the next layer protocol.

In some embodiments, the forward equivalence class classification is receive forward equivalence class classification of the packets received via the physical port from the group of real network devices.

The receive forward equivalence class classification performs inspection of the label values in the packets, uses the label values to access forward equivalence class bindings, determines a next layer protocol, and varies the emulated receive processing subsequent to the forward equivalence class classification with the particular successful classifications of the forward equivalence class bindings.

The receive forward equivalence class classification handles reserved label values, instead of ignoring the reserved label values. One such reserved label value is implicit null. The receive forward equivalence class classification handles reserved label values to determine a next layer protocol type.

In various embodiments, the receive forward equivalence class classification associates a source MAC address of an encapsulated packet with an endpoint in a layer 2 virtual LAN, associates a source MAC address in at least one of the packets with an endpoint in a Virtual Private LAN Service, emulates a layer 2 switch MAC learning table on a layer 2 virtual LAN and/or on a Virtual Private LAN Service, uses the forward equivalence class bindings to disambiguate different layer 2 Virtual Private Networks and/or to disambiguate different layer 3 Virtual Private Networks.

In some embodiments, the forward equivalence class classification is transmit forward equivalence class classification of the packets transmitted via the physical port from the group of emulated network devices.

The transmit forward equivalence class classification performs inspection of the contents of the packets, performs assignment of forward equivalence class bindings from the inspection of the contents of the packets, and varies the emulated transmit processing subsequent to the forward equivalence class classification with the particular successful assignment of the forward equivalence class bindings.

The successful classifications determine an IP address of a next hop router and an IP address of a resolving router.

The transmit forward equivalence class classification handles reserved label values. One such reserved label value is implicit null.

In various embodiments, the transmit forward equivalence class classification inspects upper layers of the packets for Quality of Service metrics, inspects upper layer upper layers of the packets for time to live values, selectively performs forward equivalence class classification in particular layers and selectively skips forward equivalence class classification in other particular layers, performs Virtual Private LAN Service flooding, performs static lookaside, is performed on a simulated packet, and/or determines a next hop MAC address for lower layers of the packets.

With regard to Quality of Service metrics. te MPLS label has three bits reserved. Service providess have adopted the three bits for QoS. An ingress router picks certain metrics, and assigns bits for QoS.

Static lookaside is for testing purposes. Despite a packet not normally being assigned to a particular label switched path, manual FEC assignment can be performed.

A simulated packet is for user diagnostic purposes, and doesn't have to be actually transmitted. For example, with a device under test, configuration errors, or protocol implementation errors can be detected.

The label value 3 is defined as the implicit NULL label. LSRs can assign and distribute this label however it will never appear in actual packets—instead it is implicitly there, like an imaginary protocol layer. The receive side requires speculative classifications to imaginary FEC's and multiple dispatch of incoming packets. The transmit side can explicitly or implicitly classify to implicit NULL—either way, nothing is pushed on the packet. Implicit NULL classification allows a BGP connection to start (on the wire) as IP-Eth and then switches to IP-MPLS-Eth once labels are bound.

VPLS complexities are described. Efficient L2 VPN operation requires MAC learning so that unicast packets are not flooded unnecessarily. After a receive side classification to a VPLS FEC, the source MAC address is [re]associated with the originating endpoint.

VPLS flooding is described. During a flood, the packet is sent to all VPN endpoints. Each flooded packet may take a different path through the core, so this requires separate lower-layer classifications.

In some embodiments the physical port is any of: Ethernet, Packet over Synchronous optical networking, Packet over Synchronous Digital Hierarchy, Asynchronous Transfer Mode, and WiMAX.

In some embodiments the network devices include at least one of a host, a switch, and a router.

In some embodiments encapsulation protocols of the plurality of encapsulated protocol stacks include at least one of: Internet Protocol, Generic Routing Encapsulation, Ethernet, Virtual Local Area Network 802.1q, Multiprotocol Label Switching, Point to Point Protocol over Ethernet, Point to Point Protocol, Layer 2 Tunneling Protocol, WiMAX, Provider Backbone Bridge 802.1ah, and Asynchronous Transfer Mode.

Many embodiments emulate the packet sending process of a network device. Some embodiments process the packet with an encapsulated protocol stack corresponding to the network device, and send the packet via the physical port. Some embodiments create the packet with a payload part and an additional part having space sufficient to store encapsulated protocol data added by encapsulated protocol stack processing.

Many embodiments emulate the packet receiving process of a network device. Some embodiments receive a packet via the physical port, and process the packet with an encapsulated protocol stack corresponding to the network device. Some embodiments identify the encapsulated protocol stack based on at least sets of values corresponding to the encapsulated protocol stack. The sets of values specific to packet processing of particular encapsulation protocols.

Many embodiments emulate the broadcast packet receiving process of a network device. Some embodiments receive either a broadcast packet or a multicast packet via the physical port, process the packet with an encapsulated protocol stack corresponding to the network device, such that the encapsulated protocol stack is in a broadcast domain. This includes identifying the broadcast domain of only a subset of the encapsulated protocol stacks; and based on the broadcast domain decreasing processing of the packet with encapsulated protocol stacks outside of the broadcast domain.

Some embodiments store statistics based on packets processed by the plurality of encapsulated protocol stacks.

Some embodiments emulate network layer communication of the plurality of network devices with a socket Application Programming Interface.

Various methods, apparatuses, data structures, and computer readable media are directed to the disclosed embodiments.

BRIEF DESCRIPTION OF THE DRAWINGS

FIGS. 4A-4F show an additional variety of exemplary encapsulated protocol stacks emulating network devices, formed from variable combinations of encapsulation protocols such as shown in FIG. 2.

DETAILED DESCRIPTION

Figure 1:
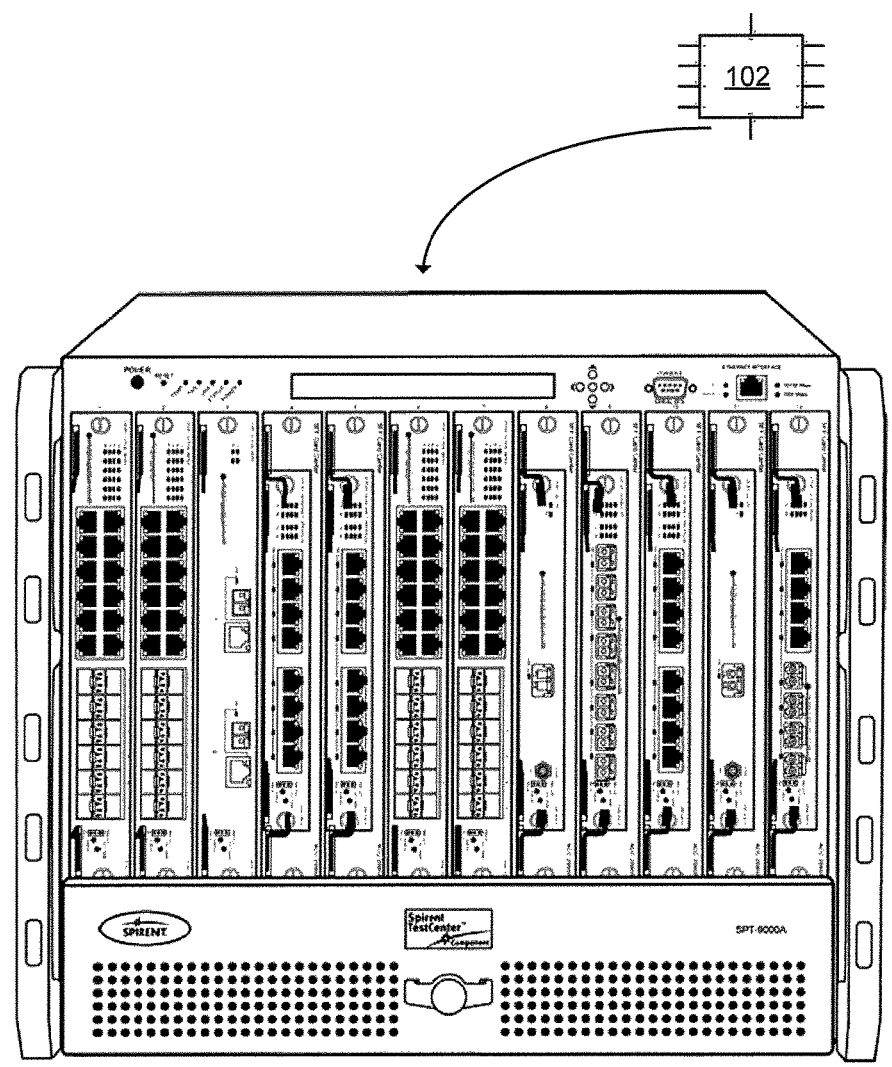
FIG. 1 is shows a Spirent SPT-9000A test chassis, with many physical ports via which multiple network devices and be emulated.

FIG. 1 is shows a Spirent SPT-9000A test chassis 101, with many physical ports via which multiple network devices can be emulated. The test chassis 101 includes at least one memory 102 that stores a tree data structure as discussed herein.

Figure 2:
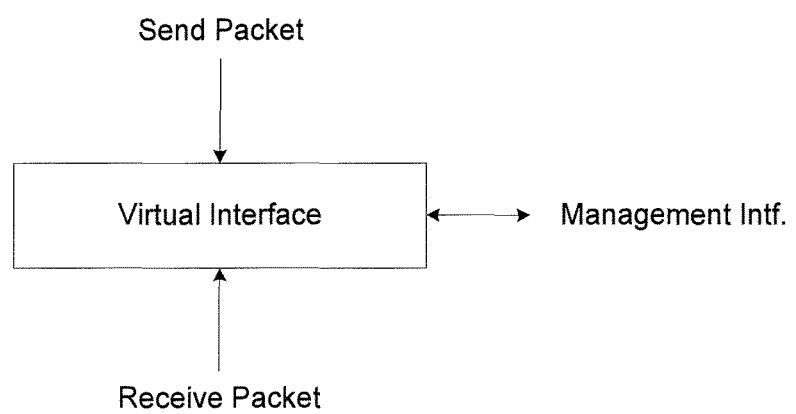
FIG. 2 shows an exemplary encapsulation protocol, where multiple such encapsulation protocols are variably combined to form an encapsulated protocol stack to emulate a network device.

FIG. 2 shows an exemplary encapsulation protocol, where multiple such encapsulation protocols are variably combined to form an encapsulated protocol stack to emulate a network device. Such a variably combinable encapsulation protocol is also referred to as a "virtual interface" or "VIF".

The VIF manages operations such as send a packet and receive a packet. The VIF is a small structure representing a single protocol layer maintained and organized in operating system kernel memory. Examples of protocol layers are Internet Protocol (e.g., versions 4 and 6), Generic Routing Encapsulation, Ethernet (e.g., 10 MBit/s, 100 MBit/s, 1 Gbit/s, 10 Gbit/s), Virtual Local Area Network 802.1q, Multiprotocol Label Switching, Point to Point Protocol over Ethernet, Point to Point Protocol, and Layer 2 Tunneling Protocol (e.g., versions 2 and 3), WiMAX, Provider Backbone Bridge 802.1ah, and Asynchronous Transfer Mode (e.g., adaptation layers 1-5).

The VIF has a protocol value specifying the protocol type. The VIF also has a set of values specific to the protocol type. An exemplary XML template listing such sets of values follows:

```
<?xml version="1.0" standalone="yes" ?>
- <vifs>
  - <vif type="ipv4">
    - <config>
        <param name="addr" type="ipv4_addr_t" key="yes" />
        <param name="prefix_len" type="uint8_t" key="yes" />
      </config>
    </vif>
  - <vif type="ipv6">
    - <config>
        <param name="addr" type="ipv6_addr_t" key="yes" />
        <param name="prefix_len" type="uint8_t" key="yes" />
      </config>
    </vif>
  - <vif type="gre">
    - <config>
        <param name="local_addr" type="ipv4_addr_t" key="yes" />
        <param name="remote_addr" type="ipv4_addr_t" key="yes" />
        <param name="checksum_enable" type="uint8_t" optional="yes" default="1" />
        <param name="inflow_key_enable" type="uint8_t" optional="yes" default="0" />
        <param name="outflow_key_enable" type="uint8_t" optional="yes" default="0" />
        <param name="sequence_enable" type="uint8_t" optional="yes" default="1" />
        <param name="inflow_key" type="uint32_t" optional="yes" base="16" default="0" />
        <param name="outflow_key" type="uint32_t" optional="yes" base="16" default="0" />
      </config>
    </vif>
  - <vif type="eth">
    - <config>
        <param name="mac" type="mac_addr_t" key="yes" />
      </config>
    </vif>
  - <vif type="vlan">
    - <config>
        <param name="id" type="uint16_t" key="yes" />
        <param name="tpid" type="uint16_t" optional="yes" base="16" default="0x8100" />
        <param name="priority" type="uint8_t" optional="yes" />
        <param name="cfi" type="uint8_t" optional="yes" />
      </config>
    </vif>
  - <vif type="mpls">
    </vif>
  - <vif type="pppoe">
```

-continued
```
- <config>
    <param name="dst_mac" type="mac_addr_t" />
    <param name="code" type="uint8_t" optional="yes" />
    <param name="sid" type="uint16_t" key="yes" />
  </config>
</vif>
- <vif type="l2tpv2">
 - <config>
    <param name="use_length" type="uint8_t" optional="yes" default="1" />
    <param name="use_seq" type="uint8_t" optional="yes" default="1" />
    <param name="use_offset" type="uint8_t" optional="yes" default="0" />
    <param name="use_priority" type="uint8_t" optional="yes" default="0" />
    <param name="local_tunnel_id" type="uint16_t" key="yes" />
    <param name="local_session_id" type="uint16_t" key="yes" />
    <param name="remote_tunnel_id" type="uint16_t" optional="yes" default="0" />
    <param name="remote_session_id" type="uint16_t" optional="yes" default="0" />
    <param name="local_port" type="uint16_t" key="yes" optional="yes" default="1701" />
    <param name="remote_port" type="uint16_t" key="yes" optional="yes" default="1701" />
    <param name="remote_addr" type="ipv4_addr_t" key="yes" optional="yes" default="0.0.0.0" />
  </config>
</vif>
- <vif type="l2tpv3">
 - <config>
    <param name="direct_ip" type="uint8_t" optional="yes" default="0" />
    <param name="cookie_length" type="uint8_t" optional="yes" default="0" />
    <param name="l2_sublayer_type" type="uint8_t" optional="yes" default="1" />
    <param name="data_seq_level" type="uint8_t" optional="yes" default="2" />
    <param name="pw_type" type="uint16_t" optional="yes" default="5" />
    <param name="session_id" type="uint32_t" key="yes" />
    <param name="cookie" type="uint8_t[8]" optional="yes" />
    <param name="local_port" type="uint16_t" key="yes" optional="yes" default="1701" />
    <param name="remote_port" type="uint16_t" key="yes" optional="yes" default="1701" />
    <param name="remote_addr" type="ipv4_addr_t" key="yes" />
  </config>
</vif>
- <vif type="spimax">
 - <config>
    <param name="xcvr_mac" type="mac_addr_t" key="yes" />
    <param name="ss_mac" type="mac_addr_t" />
    <param name="cid" type="uint16_t" key="yes" />
  </config>
</vif>
- <vif type="itag">
 - <config>
    <param name="isid" type="uint32_t" key="yes" />
    <param name="dst_mac" type="mac_addr_t" />
    <param name="pcp" type="uint8_t" optional="yes" />
    <param name="dei" type="uint8_t" optional="yes" />
    <param name="nca" type="uint8_t" optional="yes" />
    <param name="res1" type="uint8_t" optional="yes" />
    <param name="res2" type="uint8_t" optional="yes" />
  </config>
</vif>
- <vif type="aal5">
 - <config>
    <param name="vpi" type="uint16_t" key="yes" />
    <param name="vci" type="uint16_t" key="yes" />
    <param name="gfc" type="uint8_t" optional="yes" />
    <param name="pti" type="uint8_t" optional="yes" />
    <param name="clp" type="uint8_t" optional="yes" />
    <param name="uu" type="uint8_t" optional="yes" />
    <param name="cpi" type="uint8_t" optional="yes" />
    <param name="encap" type="uint8_t" />
    <param name="ethertype" type="uint16_t" optional="yes" base="16" default="0" />
  </config>
</vif>
</vifs>
```

Figure 3:
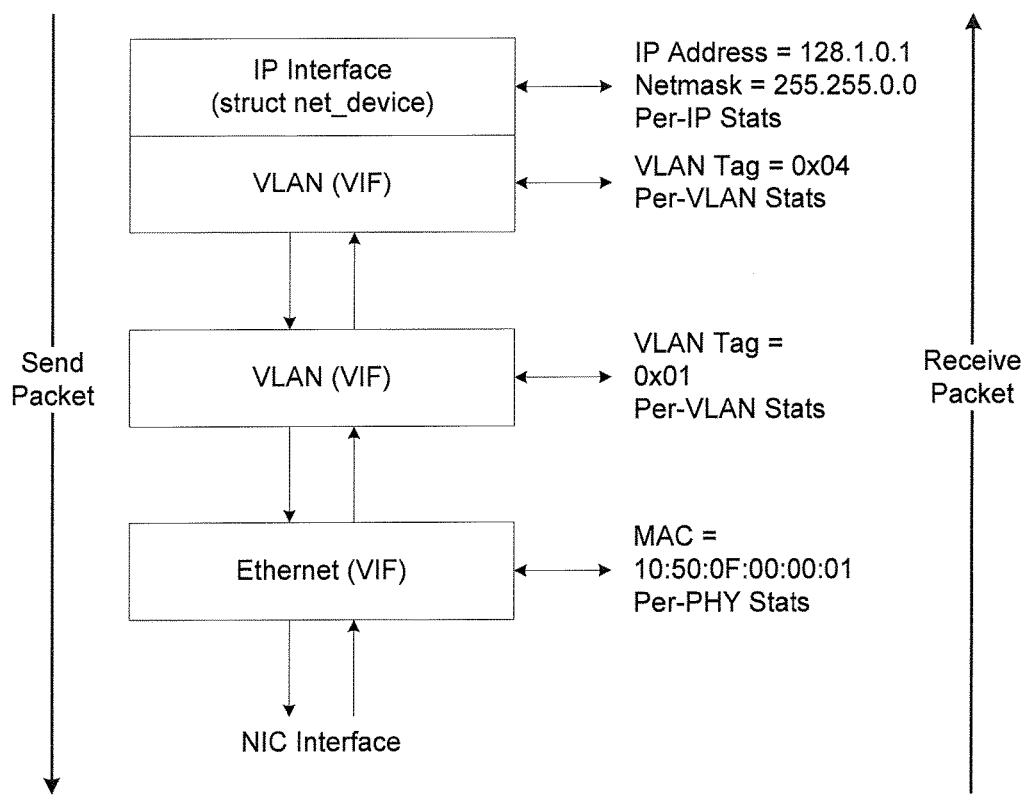
FIG. 3 shows an exemplary encapsulated protocol stack emulating a network device, formed from a variable combination of encapsulation protocols such as shown in FIG. 2.

FIG. 3 shows an exemplary encapsulated protocol stack emulating a network device, formed from a variable combination of encapsulation protocols such as shown in FIG. 2.

FIGS. 4A-4F show an additional variety of exemplary encapsulated protocol stacks emulating network devices, formed from variable combinations of encapsulation protocols such as shown in FIG. 2.

Figure 5:
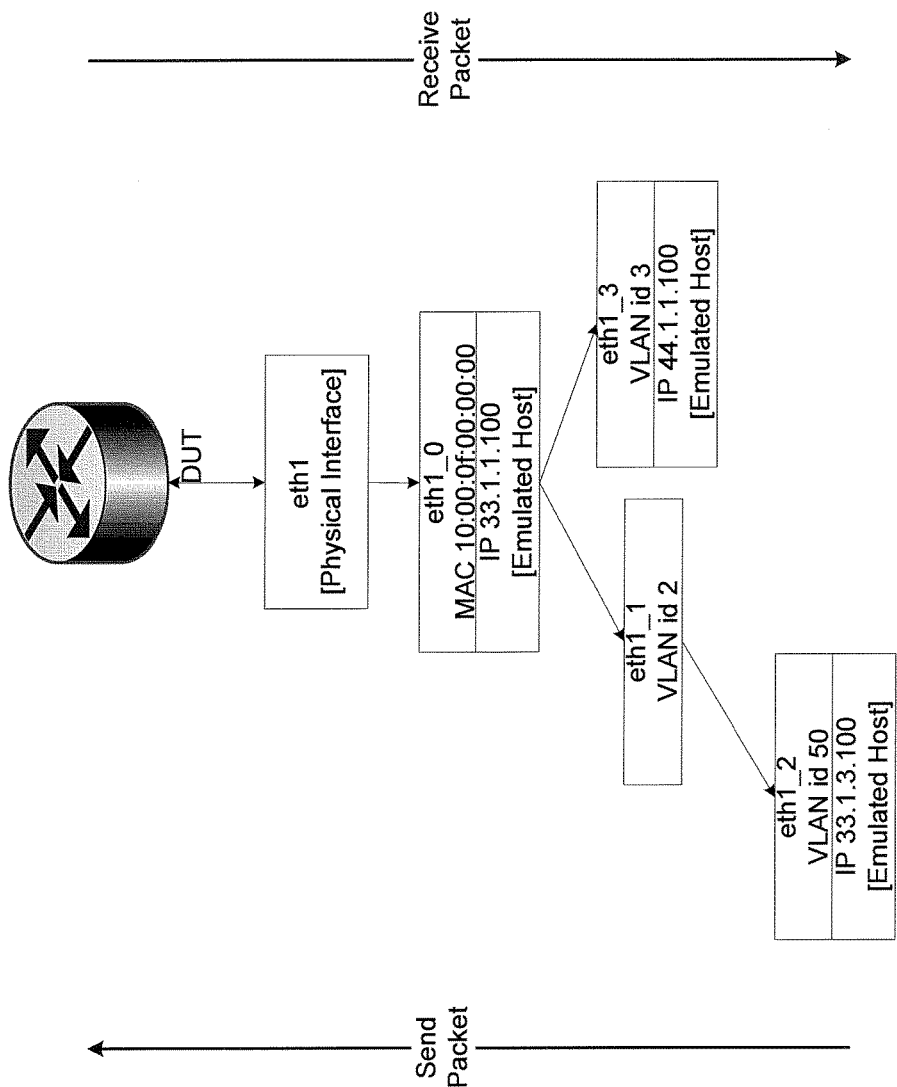
FIG. 5 shows an exemplary data structure representing multiple network devices communicating via a physical port.

FIG. 5 shows an exemplary data structure representing multiple network devices communicating via a physical port.

The tree data structure allocates one node per VIF. The root node of the tree is a special VIF representing the physical interface PHY, such as a port for Ethernet or a port for Packet over SONET/SDH. In this particular view, as a result of tree operations, the tree grows down as children nodes representing encapsulation protocols are added, to emulate network devices that do not exist physically. The tree has a depth equivalent to that of the tallest encapsulated protocol stack.

The process of sending a packet from an emulated device begins at a leaf node of the tree, and the process of receiving a packet at an emulated device begins at the root node of the tree. All children nodes of a particular node are unique, to prevent ambiguity about the recipient emulated device. In one embodiment, to ensure such uniqueness, the protocol-specific set of values associated with each child node is unique with respect to the protocol-specific set of values associated with all other peer nodes. A simple embodiment just assigns a unique name.

At any given node, the collection of child nodes has properties of a red black tree, such that the node can have any number of children. Accordingly, child lookup has efficient performance of $O(\log_2 n)$, with n being the number of potentially consulted nodes in the lookup.

Figure 6:
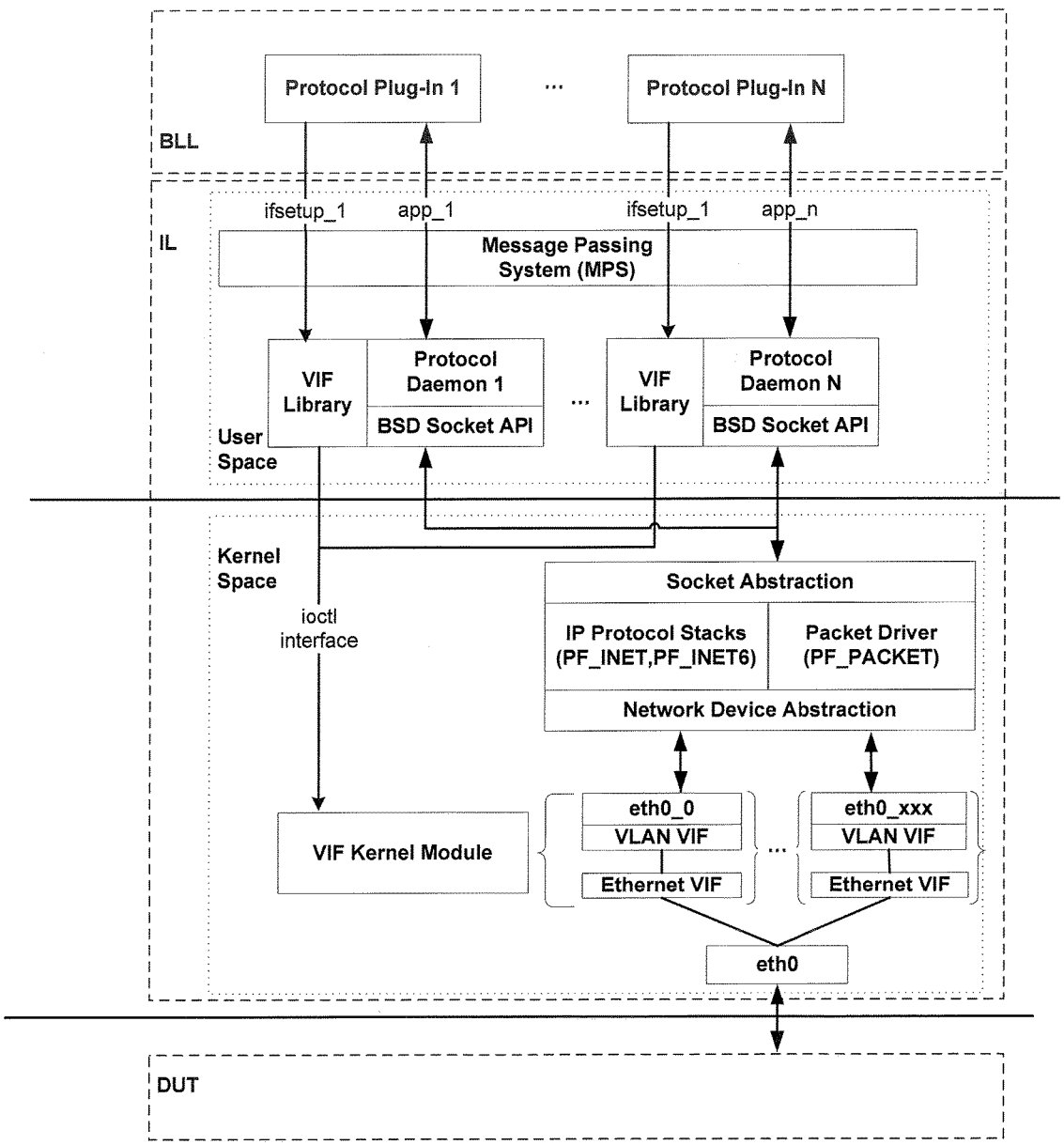
FIG. 6 shows an exemplary architectural diagram indicating the interaction of an exemplary data structure representing multiple network devices communicating via a physical port, with an operating system of test equipment, and with another computer having a user interface.

FIG. 6 shows an exemplary architectural diagram indicating the interaction of an exemplary data structure representing multiple network devices communicating via a physical port, with an operating system of test equipment, and with another computer having a user interface.

Shown are the business layer logic (BLL) and instrument layer logic (IL) of a test device communicating with a device under test (DUT). The test device includes hardware and software that implement features described herein. The test device may include one or more of logic arrays, memories, analog circuits, digital circuits, software, firmware and processors such as microprocessors, field programmable gate arrays (FPGAs), application-specific integrated circuits (ASICs), programmable logic devices (PLDs) and programmable logic arrays (PLAs). The hardware may be found in the chassis, card rack or integrated unit. It may include or operate with the console or the general purpose computer in communication with the test device. The test device may include a number of separate units that are clustered together, as shown in FIG. 1, or remote from one another. For some levels of testing and some components of an overall test setup, the test control may be implemented on a computer such as a personal computer, server or workstation.

Typically, the BLL has been hosted on a laptop or PC and provided a user interface and control for a test chassis that included both general purpose CPUs and FPGAs. The FPGAs have been dynamically configured to optimize test packet generation. Some combination of hardware supports the BLL and IL logic.

The IL logic depicts an operating system view divided into kernel space and user space. An exemplary division reserves kernel space for operating system kernel, kernel extensions, and some device drivers and permits user mode applications to reside in user space.

An ifsetup message sets up the interface, and is shown in the figure, sending requests from a protocol plug-in in BLL, to a VIF library in user space, which in turn makes ioctl system calls to a dynamically loaded VIF kernel module in kernel space.

A list of the operations that the kernel module's interface manager accept from user space, follows:
Create VIF
Destroy VIF
Enable/Disable VIF (enabling a VIF in this sense causes a net_device structure to be allocated and made visible to the rest of the Linux O/S—typically for leaf node VIF's)
Get VIF Status
Get VIF Configuration
Modify VIF Configuration
Get VIF Children
Reset VIF Statistics The kernel module creates the tree data structure as discussed in FIG. 5, shown with a VIF representing the physical port as the root node. Also as shown, the kernel module does not have to create a net_device at each layer, and instead creates one net_device (e.g., eth0_0, . . . , eth0_xxx) at each leaf node, which supports the BSD socket API and can take advantage of any built-in command line utilities of the operating system. Because the kernel model sandwiches protocol specific VIFs, the kernel model hides complexity of the encapsulated protocols from the OS and upper layer utilities in the IL and BLL.

The operating system is non-limiting, and can be, e.g., embedded Linux, other Unix derivatives such as BSD, VxWorks, IOS by Cisco, etc.

The process of sending a packet is described as follows. In the IL, the data to be sent is generated by a protocol daemon. The socket API communicates the data to be sent to kernel space. Then within kernel space, the socket abstraction, one of the protocol stacks (IP protocol stacks PF_INET or PF_INET, packet driver PF_PACKET) sends a partially built packet from the emulated device. As the partially built packet is processed by each encapsulated protocol of the emulated device, protocols headers are added until the packet is complete, and ready to send via the physical port.

Some embodiments create partly formed packets with sufficient headroom to store additional header data added by each subsequent encapsulated protocol, to prevent wasteful copying and reallocating of memory.

Some embodiments allow the MPLS encapsulated protocol, PPPoE encapsulated protocol and the Ethernet encapsulated protocol to determine and communicate the destination address of a peer.

The process of receiving a packet follows oppositely ordered iterative steps of the sending process. However, the receive process has the ambiguity about how a parent node determines which of multiple children nodes is an immediate destination following any processing by the parent node. This ambiguity is resolved by the VIF kernel module with the unique node data discussed in connection with FIG. 5. The particular encapsulated protocol of a candidate child node extracts key fields from the packet. If comparison between key fields of the received packet matches the unique data of a child node, the encapsulated protocol continues processing such as validating the packet and removing header data corresponding to that encapsulated protocol. However, if the match process fails, then the packet is discarded.

Broadcast/multicast packets are treated specially to prevent the prohibitive expense of repeated processing of the same packet by a large number of emulated devices.

In one mechanism, a special case handler determines the broadcast domain of the packet, and sends copies of the packet to only nodes that belong to that broadcast domain.

In another mechanism, for Ethernet VLAN 802.1q, a hash is consulted which was developed to determine whether any leaf nodes in the tree belong to the same broadcast domain. This hash prevents traversal of the entire tree.

Several IPv4 special rules are as follows:

1) Broadcast IPv4 packet: IPv4 broadcasts are received one time at the first VIF in a broadcast domain.

2) Multicast IPv4 packet: IPv4 multicasts are receive at all VIFs in the broadcast domain.

3) Unicast IPv4 packet: IPv4 unicasts are received by only the VIF with that address. Besides eliminating non-broadcast domain packets, this eliminates other leaf VIFs without that IP address.

These rules apply to IPv6.

ARP (Address Resolution Protocol) has a special rule as well. An ARP broadcast is received only at VIFs with matching IP addresses.

Some operating systems such as Linux allow the maintenance a net_device multicast list. The multicast list may be consulted to eliminate VIFs outside that broadcast domain.

Figure 7:
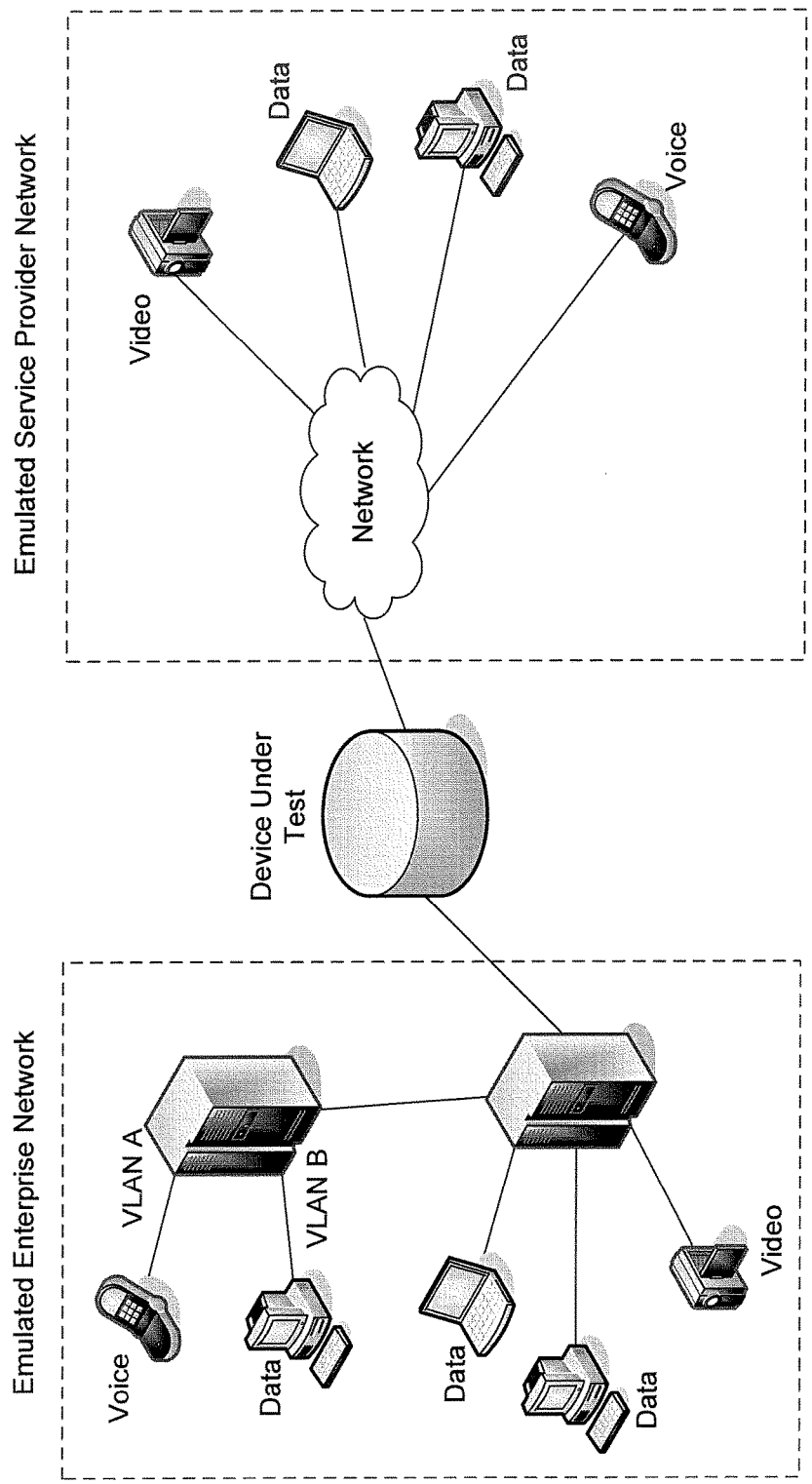
FIG. 7 shows an exemplary network device topology with groups of network devices communicating traffic, all emulated by variable combinations of encapsulation protocols.

FIG. 7 shows an exemplary network device topology with groups of network devices communicating traffic, all emulated by variable combinations of encapsulation protocols.

Figure 8:
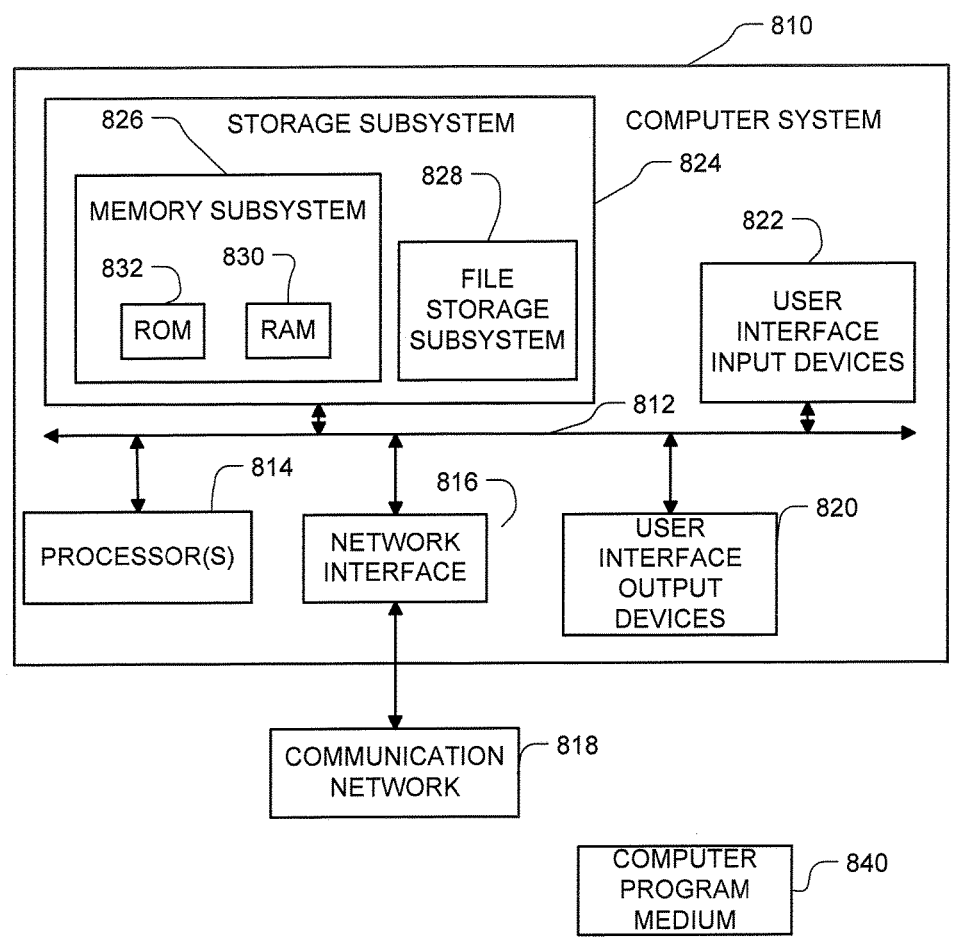
FIG. 8 shows a block diagram of an exemplary computer system.

FIG. 8 shows a block diagram of an exemplary computer system 810 suitable for use with embodiments of the technology, such as at the BLL or IL. Computer system 810 typically includes at least one processor 814 which communicates with a number of peripheral devices via bus subsystem 812. These peripheral devices may include a storage subsystem 824, comprising a memory subsystem 826 and a file storage subsystem 828, user interface input devices 822, user interface output devices 820, and a network interface subsystem 816. The input and output devices allow user interaction with computer system 810. Network interface subsystem 816 provides an interface to outside networks, including an interface to communication network 818, and is coupled via communication network 818 to corresponding interface devices in other computer systems. Communication network 818 may comprise many interconnected computer systems and communication links. These communication links may be wireline links, optical links, wireless links, or any other mechanisms for communication of information. While in one embodiment, communication network 818 is the Internet, in other embodiments, communication network 818 may be any suitable computer network.

User interface input devices 822 may include a keyboard, pointing devices such as a mouse, trackball, touchpad, or graphics tablet, a scanner, a touchscreen incorporated into the display, audio input devices such as voice recognition systems, microphones, and other types of input devices. In general, use of the term "input device" is intended to include all possible types of devices and ways to input information into computer system 810 or onto computer network 818.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 810 to the user or to another machine or computer system.

Storage subsystem 824 stores the basic programming and data constructs that provide the functionality of certain embodiments. For example, the various modules implementing the functionality of certain embodiments may be stored in storage subsystem 824. These software modules are generally executed by processor 814.

Memory subsystem 826 typically includes a number of memories including a main random access memory (RAM) 830 for storage of instructions and data during program execution and a read only memory (ROM) 832 in which fixed instructions are stored. File storage subsystem 828 provides persistent storage for program and data files, and may include a hard disk drive, a floppy disk drive along with associated removable media, a CD-ROM drive, an optical drive, or removable media cartridges. The databases and modules implementing the functionality of certain embodiments may be stored by file storage subsystem 828.

Bus subsystem 812 provides a mechanism for letting the various components and subsystems of computer system 810 communicate with each other as intended. Although bus subsystem 812 is shown schematically as a single bus, alternative embodiments of the bus subsystem may use multiple busses.

Computer readable medium 840 can be a medium associated with file storage subsystem 828, and/or with network interface 816. The computer readable medium can be a hard disk, a floppy disk, a CD-ROM, an optical medium, removable media cartridge, or electromagnetic wave. The computer readable medium 840 is shown storing program instructions performing the described technology.

Computer system 810 itself can be of varying types including a personal computer, a portable computer, a workstation, a computer terminal, a network computer, a television, a mainframe, or any other data processing system or user device. Due to the ever-changing nature of computers and networks, the description of computer system 810 depicted in FIG. 8 is intended only as a specific example for purposes of illustrating the preferred embodiments. Many other configurations of computer system 810 are possible having more or less components than the computer system depicted in FIG. 8.

Figure 9:
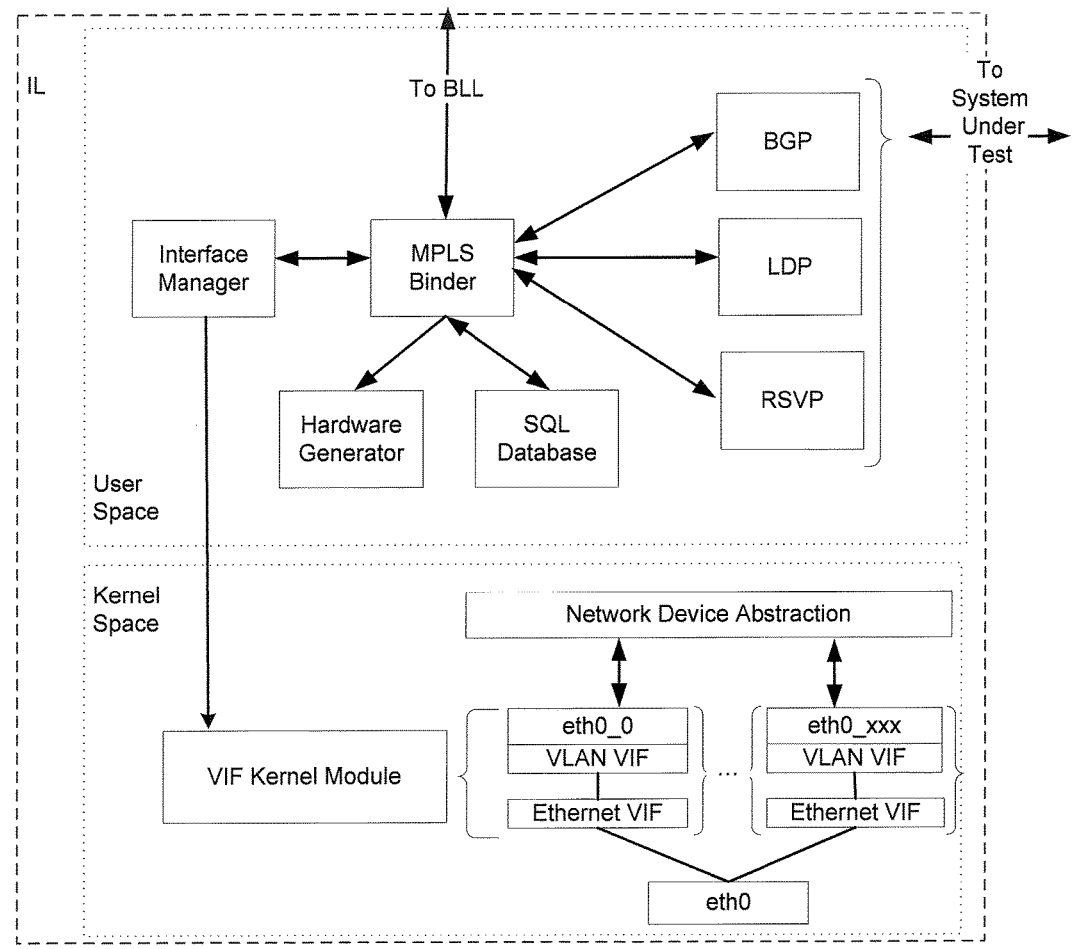
FIG. 9 shows additional detail of FIG. 6, and shows exemplary architectural details specific to MPLS.

FIG. 9 shows additional detail of FIG. 6, and shows exemplary architectural details specific to MPLS.

The VIF kernel module communicates with the interface manager of user space. The MPLS binder communicates with the interface manager. The MPLS Binder is discussed in detail below. MPLS information is exchanged via various protocols such as BGP, LDP, and RSVP with the system under test. Binding information is exchanged with an SQL database. The hardware generator generates packets to transmit based on the MPLS binder. Finally, the MPLS binder communicates with the BLL.

Figure 10:
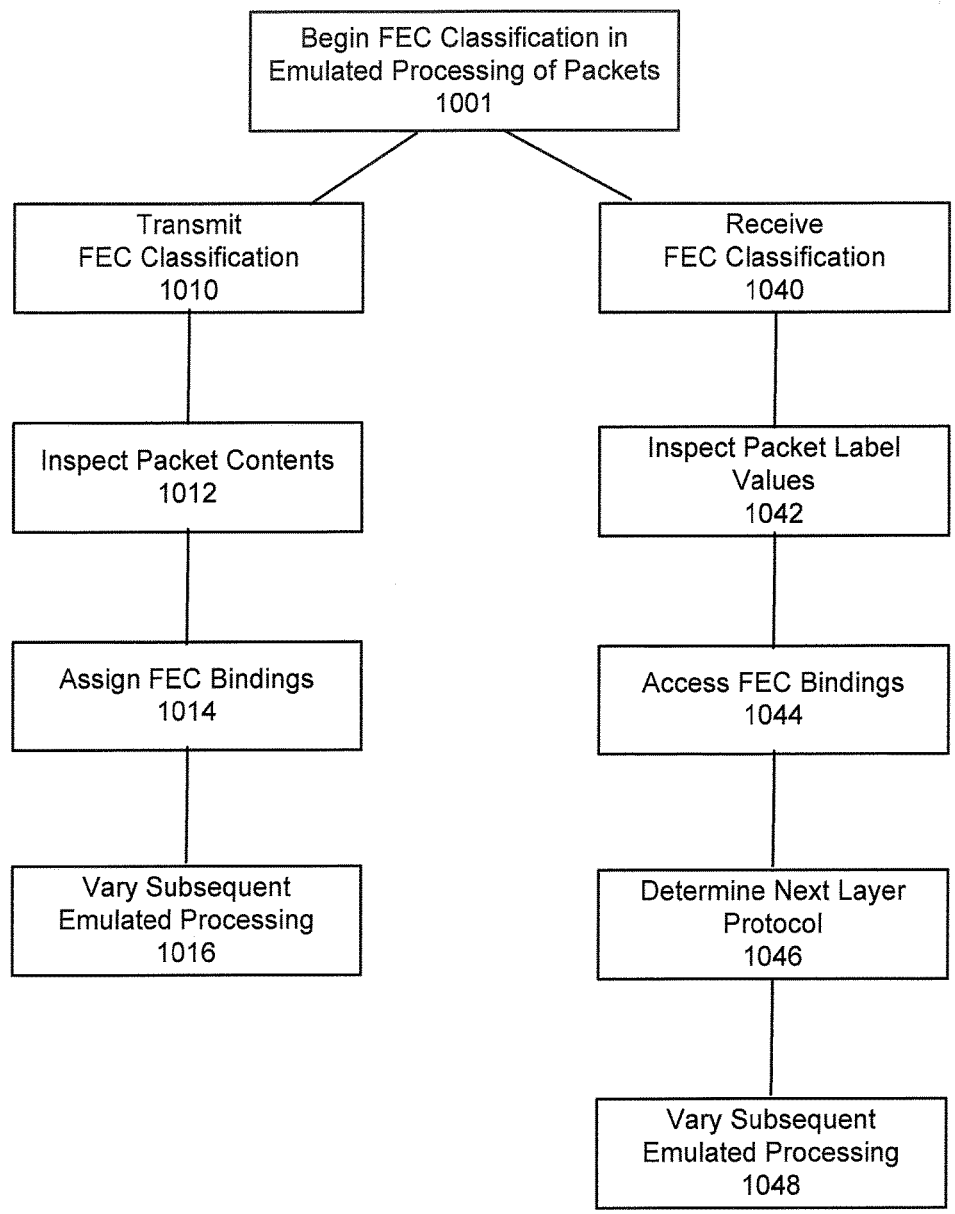
FIG. 10 shows an example process flow of MPLS FEC classification, with difference branches for transmit FEC classification and receive FEC classification.

FIG. 10 shows an example process flow of MPLS FEC classification, with different branches for transmit FEC classification 1010 and receive FEC classification 1040.

The receive forward equivalence class classification 1040 performs inspection of the label values in the packets 1042, uses the label values to access forward equivalence class bindings 1044, determines a next layer protocol 1046, and varies the emulated receive processing subsequent to the forward equivalence class classification with the particular successful classifications of the forward equivalence class bindings 1048.

The transmit forward equivalence class classification 1010 performs inspection of the contents of the packets 1012, performs assignment of forward equivalence class bindings from the inspection of the contents of the packets 1014, and varies the emulated transmit processing subsequent to the forward equivalence class classification with the particular successful assignment of the forward equivalence class bindings 1016.

Various embodiments perform test equipment emulation of MPLS Label Switch Routers (LSRs)—including networks of LSRs or devices behind LSRs (hereafter "MPLS networks")—carrying "real world" L2-L7 traffic. Various embodiments solve some combination of one or more of five problems that enable such emulation:

1. Emulated (i.e. transmitted) packets sourced from higher layer protocols may be classified as a member of a Forwarding Equivalence Class (FEC) based on a potential combination of source IP address, destination IP address, destination MAC address and Virtual Private Network identifier. Successful FEC classification allows packets to be "tagged" with a MPLS label value as a LSR would do in a real MPLS network. The results of FEC classification cannot be easily predicted a priori. FEC classification takes place on a per-packet basis as packets are prepared for transmission.

2. Incoming (i.e. received) packets that are tagged with MPLS label values are classified as a member of a Forwarding Equivalence Class (FEC) based on a label-to-FEC lookup. Successful FEC classification allows packets to be fully received and processed in the correct context as a LSR would do in a real MPLS network. FEC classification takes place on a per-packet basis as packets arrive at a network interface.

3. In MPLS networks packets may be tagged multiple times by multiple LSRs creating a "stack" of MPLS label values. Emulation of MPLS networks is facilitated by encapsulating each LSR's behavior and state into a MPLS virtual interface. Each MPLS virtual interface processes a single layer of the MPLS label stack. MPLS virtual interfaces may also be used as the substrate for other virtual interface types to enable emulation of L2 (i.e. Ethernet) VPNs or L3 (i.e. Internet Protocol) VPNs.

4. Currently ten different FEC types are defined: IPv4 host, IPv6 host, IPv4 prefix, IPv6 prefix, IPv4 RSVP, IPv6 RSVP, IPv4 VPN Prefix, IPv6 VPN Prefix, VPLS and PWE3. Each FEC type is uniquely defined by a set of FEC-specific configuration data. Emulation of MPLS networks requires that FEC information and MPLS label values are transmitted into the network and received from the network using a variety of protocols (BGP, RSVP, LDP). FEC-to-label bindings must be established and subsequently configured, updated and deleted in each MPLS virtual interface so that packet handling correctly emulates that of a real-world MPLS network.

5. Emulation of real-world MPLS networks requires a large number (order of magnitude: 10^6) of FECs. Relationships between emulated LSRs, higher layer emulated protocols and the system under test may be very complex. When packet handling errors do occur, they may be difficult for humans to diagnose. Each MPLS virtual interface maintains diagnostic information regarding failed classification attempts. FEC configuration data and MPLS label information are separately maintained in an embedded SQL database. Both the MPLS VIF diagnostic information and SQL database are visible to higher layers of the Spirent TestCenter system software so the information may in turn be made available in GUI or programmatic forms.

It was previously impossible for test equipment to correctly transmit MPLS-tagged packets where the destination IP address or destination Ethernet address was variable. MPLS emulation was only possible in situations where the addresses were static and thus transmit FEC classification could be performed a priori. Similarly, received packets could arrive with any combination of MPLS label values. Lacking a mechanism for per-packet FEC classification, these packets could only be minimally processed. It was not possible to emulate control-plane protocols over MPLS networks.

Some embodiments take advantage of the virtual interface technology to encapsulate FEC state and LSR behavior for a single layer of the MPLS label stack.

Some embodiments include a novel algorithm for transmit FEC classification where any given packet may be classified as belonging to one of ten different FEC types.

Some embodiments include technology that enables emulation of L2 and L3 VPNs with potentially overlapping addressing schemes, e.g. overlapping subscriber IP address spaces.

Some embodiments maintain large amounts of FEC configuration and diagnostic information in an embedded SQL database that can be easily accessed. Powerful SQL query tools speed debugging and fault isolation.

Without this technology of MPLS networks, one of ordinary skill would implement carrying real-world L2-L7 traffic by actually procuring and provisioning MPLS LSRs as part of the "test equipment", despite the large capital costs involved, difficulty of configuring and controlling such equipment, lack of vendor neutrality, and inability to isolate a specific device in the test.

Exemplary details of an implementation follow.

IL Interface Manager (IFM) Support For MPLS

Objectives

Effectively support control plane-over-MPLS through extensions to the IL IFM and VIF kernel module:

MPLS VIF supports dynamic transmit FEC classification and bound label insertion

MPLS VIF supports dynamic receive label-to-FEC mapping and subsequent processing of packets IL IFM supports the configuration of FEC/label bindings Simplified control plane-over-MPLS concepts can also be used for control-plane-over-WiMax. On WiMax interfaces selection of transport CID is based on destination IP address and potentially other IP header fields (ToS).

General Structure of a MPLS FEC/Label Binding

MPLS FEC/label binding=tuple(FEC type,

FEC-type-specific data,

MPLS label value,

IP address of resolving router (1),

IP address of next hop router,

MAC address of next hop router (2)

Routing's binder maintains an embedded SQL database of all bindings. Each MPLS VIF is configured with a subset of bindings.

(1) The IP address of the resolving router is only significant for RSVP FECs (2) The MAC address of the next hop router is only significant for the outer-most label stack entry (LSE)

MPLS FEC Types

Currently, there are ten FEC types specified: IPv4/IPv6 Host, IPv4/IPv6 Prefix, IPv4/IPv6 RSVP, IPv4/IPv6 VPN Prefix, VPLS and PWE3.

Host FEC types are implemented as a special case of Prefix FEC types (with a prefix length of 32 or 128 bits for IPv4 and IPv6 respectively). PWE3 FEC types are implemented as a special case of VPLS FEC types with a single endpoint identifier.

Other Embodiments Can Address Additional FEC Types (e.g. ITAG).

High-Level View of MPLS VIF Transmit Processing

Partially built packets that are presented to an MPLS VIF for transmit processing may have come from any number of sources:

- An IP VPN interface
- An Ethernet VIF—Perhaps with higher layer VLAN or ITAG tags
- An inner MPLS VIF—with or without a LSE actually pushed onto the packet
- Directly from one of the kernel's IP stacks without L2 encapsulation The primary transmit responsibility of a MPLS VIF is FEC classification and subsequent labeling of the packet with a MPLS label stack entry (LSE).

Transmit FEC classification varies with the FEC type. Generally, classification requires a lookup based on packet contents such as data or meta-data, e.g. longest prefix match on destination, source/destination address pair match, and destination MAC address→endpoint ID lookup. Because there are different FEC types, each with their own requirements, the transmit algorithm is guided by characteristics of the higher-layer interfaces that produced the packet:

1. Was the previous protocol layer Ethernet?
   a. If the upper-layer Ethernet interface is a member of a L2 VPN, attempt VPLS FEC classification—see VPLS FEC section below for details. If classification succeeds, go to step 8 below.
   b. If the packet wasn't sourced from a L2 VPN, it is a result of an internal STC error. Log an error message and drop the packet (ENETDOWN).
2. Assertion: The partially built packet came from a MPLS VIF or IP interface and has accessible IP address information in its packet meta-data.
3. Was the originating IP interface a member of a L3 VPN?
   a. If so, attempt VPN Prefix FEC classification—see VPN Prefix FEC section below for details. If classification succeeds, go to step 8 below.
   b. If classification fails, drop the packet (ENETDOWN).
4. Check for a static mapping of IP source/destination address to FEC. If a mapping exists, go to step 8 below.
5. Attempt RSVP FEC classification—see RSVP FEC section below for details. If classification succeeds, go to step 8 below.
6. Attempt Prefix FEC classification—see Prefix FEC section below for details. If classification succeeds, go to step 8 below.
7. If the previous protocol layer was not MPLS, assume an implicit NULL match—pass the unmodified packet to the next layer protocol for processing. If the previous protocol layer was MPLS, drop the packet (ENETDOWN).
8. FEC classification succeeded, push a LSE onto the packet using the bound label value. Update packet metadata (resolving router address becomes IP source, next hop address becomes IP destination). Pass the packet to the next layer protocol for processing.

High-Level View of MPLS VIF Receive Processing

When an MPLS VIF is presented with an incoming packet, the primary responsibility of the MPLS VIF is FEC classification and subsequent stripping of the outer-most label stack entry (LSE).

FEC classification is implemented as a simple verification that the label value is currently bound to a FEC. As long as this is true, the LSE will be stripped and the packet can be forwarded to the next-layer VIF for processing. If the label value is not currently bound, the packet is dropped (i.e. it was misrouted).

The MPLS VIF implements receive classification using a simple label lookup. As long as the incoming label value is bound to a FEC, the label stack entry is stripped and packet processing can continue. The Next-layer protocol type is determined by the "S" bit, as follows:

SBit=0: next layer protocol is MPLS
SBit=1: next layer protocol determined by bound FEC type There is also a special case of receive-side processing that is not actually implemented in the MPLS VIF but has that appearance. While in the VIF module's packet processing loop:

- If the packet cannot be received by any VIF child, but,
- There is an MPLS VIF child available at this layer, then,
- The child MPLS VIF will be considered to have received the packet via an implicit NULL label match, and.
- Packet processing will complete with the next layer protocol, guaranteed not to be MPLS.

This special case handler facilitates implicit NULL label matches at the top of MPLS label stack but prevents back-to-back MPLS interfaces from matching the implicit NULL label.

Prefix FEC Type-Specific Data and Implementation Notes
Data
IPv4 or IPv6 destination prefix
Prefix length
Transmit Implementation Notes
Obtain packet's destination IP address from packet meta-data
Classify packet to FEC using longest prefix match on destination IP address
Receive Implementation Notes
No special concerns
RSVP FEC Type-Specific Data and Implementation Notes
Data
Tunnel id
LSP index (1)
IPv4 or IPv6 source address
IPv4 or IPv6 destination address
(1) The LSP index differentiates RSVP FECs that share the same source and destination IP addresses
Transmit Implementation Notes
Obtain packet's source IP address from packet meta-data
Obtain packet's destination IP address from packet meta-data
Classify packet to FEC using exact match of source/destination addresses (since tunnel id and LSP index are not used as a key values, there may be multiple matches and the implementation will use the first match in implementation defined order)
Receive Implementation Notes
No special concerns
VPN Prefix FEC Type-Specific Data and Implementation Notes
Data Route distinguisher (1)
IPv4 or IPv6 destination prefix
Prefix length
(1) The route distinguisher differentiates VPN Prefix FECs that route to the same destination in the same VPN Transmit Implementation Notes
  Obtain the originating IP interface's route distinguisher (VPN identifier) value from packet meta-data
  Use the RD (route distinguisher) as an index to select a destination prefix tree for the correct VPN
  Obtain packet's destination IP address from packet meta-data
  Classify packet to FEC using longest prefix match on destination IP address
Receive Implementation Notes
  No special concerns
VPLS FEC Type-Specific Data and Implementation Notes
Data
  VPN identifier
  Endpoint identifier
Transmit Implementation Notes
  Obtain the originating Ethernet interface's VPN identifier from packet meta-data
  Obtain the packet's destination MAC address from packet meta-data
  If destination MAC address is unicast and has previously been paired with an endpoint identifier
    Classify packet to FEC using endpoint identifier match
  Else
    Flood packet out all FEC's with a matching VPN identifier (this will be a very expensive operation if there is more than one endpoint identifier in the VPN)
Receive Implementation Notes
  Classify packet to FEC using label value match
  If the classification succeeds
    Obtain the source MAC address from the inner Ethernet header
    Create/update a mapping from the source MAC address to the FEC's endpoint identifier
MPLS Data Structure Requirements
In many embodiments one or more of the following data structures are required on a per-VIF basis:
  A hash table mapping FEC handle→FEC (for the VIF management interface)
  A hash table mapping IPv4 source/destination addresses→ FEC (for static FEC mappings)
  A hash table mapping IPv6 source/destination addresses→ FEC (for static FEC mappings)
  A hash table mapping of label value→FEC (for Rx-side classification)
Depending on what specific FEC types are configured, additional structures will need to be maintained. Most of these are used for FEC classification during transmit however some entries (e.g. VPLS endpoint id→MAC address mappings) may also be updated during receive.
  Prefix FEC only: PATRICIA tree mapping IP prefix→FEC
  RSVP FEC only: A hash table mapping source/destination pair→FEC
  VPN Prefix FEC only: A radix tree mapping Route Distinguisher→VPN-specific PATRICIA tree in turn mapping IP prefix→FEC
  VPLS FEC only:
    A hash table mapping VPN id→FEC
    A hash table mapping MAC address→FEC Packet Meta-Data Requirements
Per-packet transmit meta-data:
  Address family (IPv4, IPv6)
  VPN identifier
  VPN type (None, L2 VPN, L3 VPN)
  Packet source IP address or resolving router IP address (IPv4 or IPv6)
  Packet destination IP address or next-hop IP address (IPv4 or IPv6)
  Packet destination MAC address
Per-packet receive meta-data:
  VPN identifier
  VPN type (None, L2 VPN, L3 VPN)
ifsetup implications
The Ethernet, IPv4 and IPv6 VIF types have additional fields to store VPN identifiers.
Rx FEC information (obtained from the BLL data model) will be applied from the BLL to the IL via routing-specific messages and not via ifsetup 1 messages
With all FEC/label binding information provided by the routing IL components, it is problematic to run control plane over statically (i.e. administratively) configured tunnels
IL Interface Manager (IFM) API Notes
The MPLS VIF needs to support five new primitives w/r/t MPLS FEC/label bindings:
  1. Hard Reset: Destroys all previous FEC/label bindings and static mappings
  2. Soft Reset: Resets MPLS VIF state (e.g. VPLS FEC clears MAC address mappings) without destroying bindings or mappings
  3. Create Binding: Creates FEC/label binding with update semantics if binding already exists
  4. Query Binding: Given a precise FEC handle, returns the current label binding
  5. Destroy Binding: Given a precise FEC handle, destroys the FEC/label binding
  6. Create Static Mapping: Creates static FEC mapping with update semantics if mapping already exists
FEC/label bindings will be committed to MPLS VIF instances by ifmgrd
MPLS control plane protocols will manage FEC/label bindings via IfMgrClient API calls, yet to be specified
Miscellaneous Notes
The MPLS VIF distinguishes between Tx FEC/label bindings and Rx FEC/label bindings
VPLS FECs has difficulty with learning MAC addresses that are received only in signature frames (since signature-tagged packets are not seen on the cut-through channel)
The following discusses routing MPLS label binder & observers
A Binder Overview follows.
The binder serves two main roles in the overall MPLS architecture:
  i) A central repository for all MPLS enabled protocols to store FEC to label bindings
  ii) A single point of registration for client code interested in FEC to label bindings
In the basic operation of the binder, client code can register observers to be notified of changes as they happen. A protocol that negotiates labels updates and deletes FEC to label bindings. When this happens, observers are notified about the change so they can react accordingly. Client code can also query the current bindings directly.
In one embodiment the binder services two clients. The Generator generates line-rate stateless data plane traffic. In some configurations, it requires dynamically bound MPLS labels for FECs known at configuration time. The VIF kernel module handles encapsulation for all stateful traffic generated by content daemons and kernel stacks. In some configurations, it requires dynamically bound MPLS labels for FECs not known until the packet needs to be encapsulated.

The binder uses an embedded database as its main data store. The central data that the binder deals with are FEC to label bindings. A binding has the following data fields:

Session Handle: Each protocol instance has a unique handle.
Device Handle: Several protocol instances can be grouped together into logical devices.
Port
Direction: There are bindings for receive and transmit processing
FEC: There are several different Forwarding Equivalence Classes
Resolver: IP address of the local protocol
Neighbor: IP address of the remote peer. Only applicable if binding is used for transmit processing.
Next Hop Mac: Mac address of the next hop. Only applicable if binding is used for transmit processing and it is at the top of the binding for the top of the label stack.
Label A session handle, direction, and FEC uniquely identify a FEC to label binding. The rest of the fields are meta information associated with the binding that are needed by some clients. For storage efficiency, this data is split up in multiple tables, as follows.

Routing Session Table:
Session Handle
Device Handle
Port
Resolver IP address
Neighbor Table:
Neighbor ID (generated)
Neighbor IP address
Next Hop Mac
Session Handle Each FEC type has its own table that associates it with a FEC id. FEC ids are used both for compression and uniform representation in other database tables.

IPv4 Prefix FEC Table:
FEC Id (generated)
IPv4 Prefix
Prefix Length
IPv6 Prefix FEC Table:
FEC Id (generated)
IPv6 Prefix
Prefix Length
IPv4 Host FEC Table:
FEC Id (generated)
IPv4 Address
IPv6 Host FEC Table:
FEC Id (generated)
IPv4 Address
VPN IPv4 Prefix FEC Table:
FEC Id (generated)
IPv4 Prefix
Prefix Length
VPN Id
VPN IPv6 Prefix FEC Table:
FEC Id (generated)
IPv6 Prefix
Prefix Length
VPN Id RSVP Tunnel FEC Table:
FEC Id (generated)
Tunnel Id
LSP Id
PWE3 FEC Table:
FEC Id (generated)
Virtual Circuit ID
VPLS FEC Table:
FEC Id (generated)
VPLS Endpoint Id
VPN Id RSVP Tunnel endpoints are stored in a separate table because they are uniquely determined by the Tunnel ID and session regardless of the LSP ID. This eases storage overhead significantly.

RSVP Tunnel Endpoint Table:
Session Handle
Tunnel ID
Tunnel Direction
Source Endpoint
Destination Endpoint And finally to pull it all back together, the binder has two tables for label storage. The first is for labels that are received from a remote peer, and the second is for labels that are advertised to remote peers.

Resolved Label Table:
FEC Id
Session Id
Neighbor Id
Label
Advertised Label Table:
FEC Id
Session Id
Label The binder has a simple API that it presents to protocols. There are 3 different things a protocol can do.

i) They can update a FEC to label binding. If the binding did not already exist, then Ids are generated and data is inserted into the tables. If the binding already existed, the Ids are found then non-key fields are updated in the tables. In either case, observers are notified of change and generated Ids.

ii) They can remove a FEC to label binding. The generated Ids are found, the information is removed from the label tables, and the observers are notified of the removal by Ids only.

iii) They can remove all FEC to label bindings associate with a session Id. This is a convenience routine for when the entire protocol session goes down. It will remove all the bindings for that session and then notify observers in the same way it would with a regular removal.

The majority of communication from the label binder to clients should be through the observer. The observer has two delegates that need to be overridden by the clients. The update delegate will be called with all Ids, binding information, and meta info, while the remove delegate will be called only with Ids and a direction. In addition to the observer notifications, clients can make the following API calls:

Given a session Id and a FEC Id, they can query for the neighbor Id that advertised it.
Given a session Id and a neighbor Id, they can query the addressing information of the neighbor.
Given a direction, session Id, and FEC, they can query for a binding.
Given a direction, session Id, and FEC id, they can query for a binding.

Given a direction and session Id, they can query for all the bindings for that session.

Given a direction and device Id, they can query for all the bindings for that device.

Given a FEC id, they can get the explicit FEC.

Given an explicit FEC, they can get the FEC Id.

They can register and unregister observers.

The BLL has an API interface to the binder, in addition to a generic SQL interface to the database.

A Generator Client Overview follows.

In order for the Generator to transmit some of its traffic, it needs dynamically bound MPLS labels to known FECs. The BLL will configure blocks of FECs to the client that the Generator needs. As these blocks resolve, the client will send messages to the Generator so it can insert the labels into its traffic. Also, the client will send periodic status updates to the BLL so it can determine when all labels are resolved. Optionally, the BLL can request all of resolved labels for the subscriptions.

The BLL can configure the client with subscriptions to FECs. Each configured subscription has a protocol session ID, a block of FECs, and a subscription ID. The protocol session ID is the ID of the protocol that must resolve the FECs. If the same FEC is resolved by a different session, it is ignored by this subscription. The subscription ID is a common ID known to the BLL, the client, and the Generator, and it is used to identify the subscription in all communications between the three processes.

Currently there are 14 types of FEC blocks that can be configured:

IPv4 Host Block: This takes a base address, increment address, and count value to algorithmically expand out into IPv4 Host FECs.

IPv4 Prefix Block: This takes a base address, increment address, count, and prefix length to algorithmically expand out into IPv4 Prefix FECs. All calculated addresses will be masked to the appropriate prefix length.

IPv4 Prefix List Block: Since the BLL allows users to configure lists of addresses, this allows them to just pass the list down. All addresses will be masked to the appropriate prefix length.

IPv4 VPN Prefix Block: This takes a VPN ID, base address, increment address, count, and prefix length to algorithmically expand out into IPv4 VPN Prefix FECs. All calculated addresses will be masked to the appropriate prefix length.

IPv4 VPN Prefix List Block: Same as IPv4 Prefix List Block, but with a VPN ID and generates IPv4 VPN Prefix FECs.

IPv6 Host Block: This takes a base address, increment address, and count value to algorithmically expand out into IPv6 Host FECs.

IPv6 Prefix Block: This takes a base address, increment address, count, and prefix length to algorithmically expand out into IPv6 Prefix FECs. All calculated addresses will be masked to the appropriate prefix length.

IPv6 Prefix List Block: Since the BLL allows users to configure lists of addresses, this allows them to just pass the list down. All addresses will be masked to the appropriate prefix length.

IPv6 VPN Prefix Block: This takes a VPN ID, base address, increment address, count, and prefix length to algorithmically expand out into IPv6 VPN Prefix FECs. All calculated addresses will be masked to the appropriate prefix length.

IPv6 VPN Prefix List Block: Same as IPv6 Prefix List Block, but with a VPN ID and generates IPv6 VPN Prefix FECs.

RSVP Block: This takes a base tunnel ID, base LSP ID, tunnel increment, LSP ID increment, and a count to produce RSVP Fecs (Address endpoint information not needed here). Since there's one count for two increments, a stutter-step pattern is used with LSP IDs rolling over into tunnel IDs.

RSVP Wild-card Block: This takes a base tunnel ID and an increment to generate tunnel IDs. This is a special binding that will bind to any LSP ID so long as the tunnel ID matches. This is used to support RSVP Make-Before-Break tunnels.

PWE3 Block: This takes a base VC ID, and an increment to generate PWE3 FECs.

VPLS Block: This takes a base VPN ID, base VEID, VPN ID skip, VEID skip, and a count to produce VPLS FECs. Since there are two field to increment with one count, this is incremented in a lock-step pattern.

Subscriptions in the Generator client are fairly simple. Each has a subscription ID, a session ID, and FEC IDs produced by the Binder from the configured FEC blocks. The FEC IDs are kept with a boolean flag indicating whether or not it is resolved. These FEC IDs are kept in a sequential list corresponding to the order in which they appeared in the FEC block. There's also an index on this list by FEC ID to allow fast updating of resolved status. In addition, the subscription object keeps track of how many FECs are resolved and if it has been bound before.

A VIF Client Overview follows.

The VIF client has the responsibility of making sure that the VIF kernel module receives all the FECs it needs. The BLL configures mappings from device handles to VIF identifiers. The client simply relays all bindings for a device to that VIF. There are also static mappings that can be configured. These are mappings from IP source and destination pairs to an arbitrary FEC. Finally the client relays Tx diagnostic requests from the BLL to the VIF kernel module.

The BLL configures mappings from device IDs to VIF identifiers. Any FEC binding associated with the device ID is updated to the VIF module via an IfMgr API. With each mapping, and optional filter is also configured. The filter will ignore certain types of FECs dependent on what's needed to support the topology. The BLL can also configure static FEC mapping. These mappings configure a source and destination IP pair to an arbitrary FEC.

Once configured, the client searches the database and updates the VIF module with all matching resolved FEC bindings. As protocols update the database with new FEC bindings or delete old FEC bindings, the client will observe these changes and update IfMgr accordingly. The client will update VIFs if the FEC bindings match the corresponding filter. There are three ways to update a FEC binding to the IfMgr:

Create a new FEC binding. This sends the FEC information, the label to which it's bound, and the next hop information to IfMgr. A handle will be returned to identify the binding.

Update a FEC binding. This sends the FEC information, the label to which it's bound, the next hop information, and the handle that was previously returned.

Delete a FEC binding. This just needs the binding handle.

When the client receives a handle for a FEC binding that matches a FEC for a configured static mapping, then that static mapping is configured in the VIF through IfMgr. That static mapping is then associated with that handle. If that FEC binding is ever removed, the static mapping is removed first.

Transmit diagnostics were implemented to assist the user in debugging a faulty configuration setup. The idea is to simulate a packet being transmitted through the VIF stack and record everything that happens. The goal is that the user will see what MPLS labels the packet would receive on its way through the stack and what FECs it matched to get those labels, or why it failed to transmit.

The BLL will send a IP address source and destination pair or a destination MAC address along with a VIF identifier to the client. The client will then in turn translate it to the appropriate request for IfMgr. The IfMgr will respond with a list of either successful resolutions with binding handles or a reason why classification failed. If the classification was successful, then the client uses the returned handle to populate a message with the FEC information and label value. If the classification was not successful, then the client constructs a message with the reason why to send to the BLL. The reasons a classification could fail would be that there was no match or that it would flood into an L2 VPN. Once all responses are handled from IfMgr, the client will respond to the BLL with a list of the constructed messages.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A test traffic generation and statistics collection system that transmits MPLS labeled packets through a device under test (abbreviated DUT) and receives the MPLS labeled packets after they pass through the DUT, including:
a device that implements a first network of emulated devices and a second network of emulated devices, the device including a plurality of encapsulated protocol stacks that represent the first network of emulated devices and the second network of emulated devices, wherein some of the encapsulated protocol stacks dynamically apply MPLS labels to packets as the packets pass from one encapsulated protocol stack to another;
the device further includes:
a test packet generator that generates packets with destination IP addresses subject to forward equivalence class (abbreviated FEC) classification;
a MPLS binder that applies FEC classification to dynamically assign equivalence classes to the packets received from the test packet generator, and adding MPLS labels to the packets, taking into account the destination IP addresses and the assigned equivalence classes;
a connection to a physical transmit port that transmits the packets with the added routing labels to the DUT;
the device further includes a packet receiver, coupled to a physical receive port, that receives packets that passed through the DUT, that counts packet statistics and that collects the packet statistics for analysis.

2. The test traffic generation and systems collection system of claim 1, further including a test controller coupled to the test packet generator and to the packet receiver.

3. The test traffic generation and systems collection system of claim 1, wherein an encapsulated protocol stack for TCP communications with an HTTP or HTTPS server includes stack layers for physical, link, network, and transport layers.

4. The test traffic generation and systems collection system of claim 1, further including configurable encapsulated protocol stacks that support protocol layers for Internet Protocol versions 4 and 6; Virtual Local Area Network 802.1q; Multiprotocol Label Switching; Point to Point Protocol over Ethernet; and Layer 2 Tunneling Protocol versions 2 and 3.

5. The test traffic generation and systems collection system of claim 1, wherein the emulated devices in the first network include client machines coupled to an on-premises router, then to an MPLS Label Switch Router, then to the transmit physical port, to transmit packets to the DUT.

6. The test traffic generation and systems collection system of claim 1, wherein a first packet labelling-encapsulated protocol stack determines the MPLS label to apply to the packet without the MPLS label being present in the packet as received by the first packet labelling-encapsulated protocol stack.

7. The test traffic generation and systems collection system of claim 6, wherein a second packet labelling-encapsulated protocol stack, among the encapsulated protocol stacks, positioned between the first packet labelling-encapsulated protocol stack and the physical transmit port, that receives the packet, applies FEC classification to the packet consistent with at least a first MPLS label already applied, adds a second MPLS label to the packet based on the FEC classification, and forwards the packet with the second MPLS label towards the physical transmit port.

8. The test traffic generation and systems collection system of claim 7, wherein an outcome of applying of FEC classification to the packet by the second packet labelling-encapsulated protocol stack is affected by the first MPLS label applied to the packet.

9. The test traffic generation and systems collection system of claim 1, wherein FEC classification takes into account an IP address of a next hop router and an IP address of a resolving router.

10. The test traffic generation and systems collection system of claim 1, wherein:
the second network of emulated devices includes a first label receipt-encapsulated protocol stack, coupled to the physical receive port, that receives an MPLS labelled packet, applies FEC receive processing to the MPLS labelled packet, determines how to process the MPLS labelled packet based on the FEC classification, and forwards the MPLS labelled packet.

11. The test traffic generation and systems collection system of claim 10, wherein the first label receipt-encapsulated protocol stack removes at least one MPLS label from the packet before forwarding the packet.

12. The test traffic generation and systems collection system of claim 11, wherein the device includes:
a second label receipt-encapsulated protocol stack, among the encapsulated protocol stacks, coupled between the physical receive port and the first label receipt-encapsulated protocol stack, that receives an MPLS labelled packet, that applies FEC receive processing to the MPLS labelled packet, determines how to process the MPLS labelled packet based on the FEC classification, removes at least one MPLS label from the MPLS labelled packet, and forwards the MPLS labelled packet towards the first label receipt-encapsulated protocol stack.

13. A method of test traffic generation and statistics collection that transmits MPLS labeled packets through a device under test (abbreviated DUT) and receives the MPLS labeled packets after they pass through the DUT, including:
- emulating a plurality of devices of a first and a second network, both the first and the second networks including encapsulated protocol stacks representing the first network of emulated devices and the second network of emulated devices, wherein some of the encapsulated protocol stacks dynamically apply MPLS labels to packets as the packets pass from one encapsulated protocol stack to another;
- providing, in the first network of emulated devices, packets from a test packet generator that generates the packets with destination IP addresses subject to forward equivalence class (abbreviated FEC) classification;
- applying FEC classification, using a component of the encapsulated protocol stacks, and dynamically assigning equivalence classes to the packets generated by the test packet generator and adding MPLS labels to the packets, taking into account the destination IP addresses and the assigned equivalence classes;
- transmitting the MPLS labelled packets through the DUT;
- receiving the MPLS labelled packets that passed through the DUT, counting packet statistics, and collecting the packet statistics for analysis.

14. The method of claim 13, further including controlling from a test controller the test packet generator that generates the packets.

15. The method of claim 13, further including emulating devices in the first network that include client machines, an on-premises router, and an MPLS Label Switch Router.

16. The method of claim 13, further including a first packet labelling-encapsulated protocol stack determining the MPLS label to apply to the packet without the MPLS label being present in the packet as received from the test packet generator.

17. The method of claim 16, further including:
- forwarding MPLS labelled packets from the first packet labelling-encapsulated protocol stack, to a second packet labelling-encapsulated protocol stack, further receiving the MPLS labelled packet, applying a second FEC classification to the MPLS labelled packet consistent with at least one MPLS label already applied, adding a second MPLS label to the MPLS labelled packet based on the second FEC classification, and forwarding the MPLS labeled packet towards a physical transmit port.

18. The method of claim 17, wherein an outcome of applying of the second FEC classification to the MPLS labelled packet is affected by the MPLS label already applied to the MPLS labelled packet.

19. A non-transitory computer readable medium, programs on the computer readable medium comprising instructions to perform the method of claim 17.

20. The method of claim 13, wherein the applying FEC classification takes into account an IP address of a next hop router and an IP address of a resolving router.

21. The method of claim 13, the device further including a first label receipt-encapsulated protocol stack, among the encapsulated protocol stacks coupled to a physical receive port, further including receiving the MPLS labelled packet, applying FEC receive processing to the MPLS labelled packet, determining how to process the MPLS labelled packet based on the FEC classification, and forwarding the MPLS labeled packet.

22. A non-transitory computer readable medium, programs on the computer readable medium comprising instructions to perform the method of claim 21.

23. The method of claim 13, further including a first label receipt-encapsulated protocol stack removing at least one label from the MPLS labelled packet before forwarding.

24. The method of claim 23, further including:
- forwarding MPLS labelled packets from a physical receive port to a second label receipt-encapsulated protocol stack, among the encapsulated protocol stacks, between the physical receive port and the first label receipt-encapsulated, the second label receipt-encapsulated protocol stack receiving an MPLS labelled packet, applying FEC receive processing to the MPLS labelled packet, determining how to process the MPLS labelled packet based on the FEC classification, removing at least one MPLS label from the MPLS labeled packet, and forwarding the MPLS labeled packet towards the first label receipt-encapsulated protocol stack.

25. A non-transitory computer readable medium, programs on the computer readable medium comprising instructions to perform the method of claim 13.

* * * * *